Nov. 2, 1943. A. BARNSTEINER 2,333,508

DEEP WELL COOKER

Filed Dec. 29, 1939

WITNESSES:

INVENTOR
Alfons Barnsteiner
BY
ATTORNEY

Patented Nov. 2, 1943

2,333,508

UNITED STATES PATENT OFFICE 2,333,508

DEEP WELL COOKER

Alfons Barnsteiner, Mansfield, Ohio, assignor to Westinghouse Electric & Manufacturing Company, East Pittsburgh, Pa., a corporation of Pennsylvania Application December 29, 1939, Serial No. 311,632

2 Claims. (Cl. 220—15)

My invention relates to deep well cookers and more particularly to a cooker structure having a non-removable outer casing.

The outer casing of the cooker structures now well known to the art are removably positioned upon the structure. This feature requires a large number of parts for properly retaining such outer casing and considerable time and labor for assembling the same. If it were possible to easily position a cover upon a cooker without requiring additional attaching parts therefor such structures could be more easily and cheaply produced. In addition, the thermal efficiency of the cooker would be increased because of the reduction in conductive heat losses through the elimination of such parts.

It is, therefore, an object of my invention to provide a cooker having an outer casing which may be easily positioned upon, and retained by, the cooker structure without the need of retaining parts.

A further object of my invention is to provide a deep well cooker having an outer casing which may be easily slid upon the inner casing of such structure and retained in such position by means of irregularities formed within the cover itself.

Another object of my invention is to provide a deep well cooker having an outer casing which has means integral therewith for retaining such cover upon the structure and spacing it a predetermined distance from the inner casing.

Still another object of my invention is to provide a terminal guard for a deep well cooker which has means integral therewith for limiting the conductive loss of heat through the bottom of the cooker.

Other objects of my invention will either be pointed out specifically in the course of the following description of a device embodying my invention, or will be apparent from such description.

In the accompanying drawing.

Figure 1:
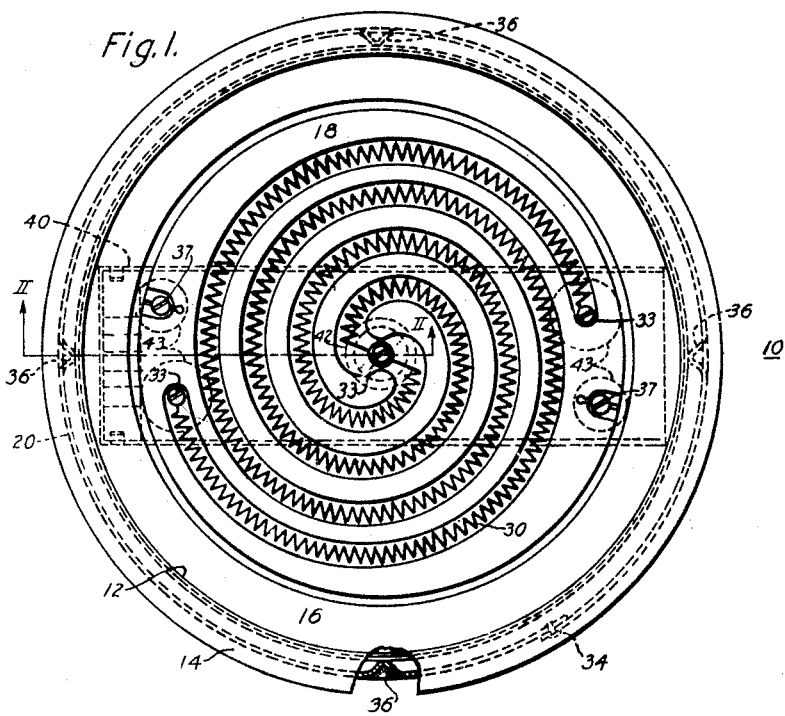
Figure 1 is a top view of a device embodying my invention.

Referring to the accompanying drawing, in which like reference characters indicate like parts in the several figures, I show a deep well cooker structure 10 comprising an inner vessel or casing 12 having a flange 14 about the top portion thereof and a cup-shaped member 16 about the bottom portion thereof with a heating element 18 positioned therein, and an outer jacket or casing 20 about the outside of such inner casing 12.

The inner vessel or casing 12, flange 14, and cup-shaped member 16 are, in this instance, formed of light metallic sheets. The casing 12 has, in this instance, a substantially circular type of cross-sectional configuration and is formed into substantially a cylindrical member. The flange 14 is formed into an annulus having a depending portion and an outwardly extending portion. The depending portion of the flange 14 is adapted to fit snugly within the inner casing 12 while the outwardly extending portion thereof is adapted to extend outwardly from the inner casing and substantially normal thereto. The depending portion of flange 14 is then fixedly attached to the inner case, say, by spot welding or the like.

The cup-shaped member 16 is formed of a light metallic sheet and comprises a centrally located hollow or depressed portion 22, an outwardly extending horizontal annular portion 24 and an upstanding ring-like sleeve portion 26. The ring-like portion 26 extends upwardly from the annularly extending portion substantially normal thereto and has an inner diameter substantially equal to the outer diameter of the inner casing 12. The inner casing 12 will thus fit within the portion 26 and rest upon the annular portion 24. The cup-shaped member 16 is then rigidly attached to the inner casing 12, say by spot welding, or the like.

The inner vessel 12 may thus be classified as comprising the functionally integral flange 14, casing 12 and the cup-shaped member 16 at the lower edge thereof. While such functionally integral structure may have various forms of outer casing or jacket positioned thereabout, it is preferred that the outer jacket or casing 20 hereinafter described be associated therewith.

The heating element 18 comprising, in this instance, a ceramic disc-shaped member 28, having a diameter slightly smaller than the depressed portion 22 in cup-shaped member 16, is positioned within such depressed portion 22. A plurality of spiral grooves are located within the top portion of the ceramic disc 28 to retain electrical resistors 30. Suitable terminal structures 32 are rigidly attached to the electrical resistors 30 at one end and to suitable lead wires (not shown) at the other end to afford means for connecting the resistors to a suitable power supply. Such resistors are then capable of supplying heat to the cooking structure.

The terminal structures 32 comprise an elongated bolt 33 which extends through the disc 28, pan 16 and a terminal guard structure 40. An insulating grommet 42 is positioned between the terminal bolt 33 and the pan 16 and guard structure 40 to insulate such bolt from both the pan and guard structure. Suitable nuts 35 are positioned upon the lower ends of terminal bolts 33 to afford means for connecting suitable power leads (not shown) thereto.

In addition, to terminal bolts 33 suitable bolts 37 pass through the disc 28, pan 16 and bosses 43 of terminal guard 40. These bolts 33 retain the terminal guard 40 in its fixed position while the terminal bolts are being loosened to connect the leads (not shown) thereto.

The terminal guard structure 40 comprises an elongated relatively shallow channel member which has a plurality of upwardly extending bosses 43 in the upper surface thereof. The bosses are relatively shallow and are adapted to space the guard downwardly from the pan 16 to limit the conductivity of heat therefrom. The guard structure 40 thus, in addition to acting as a guard member for the terminals of such cooker, increases the thermal efficiency thereof.

Figure 2:
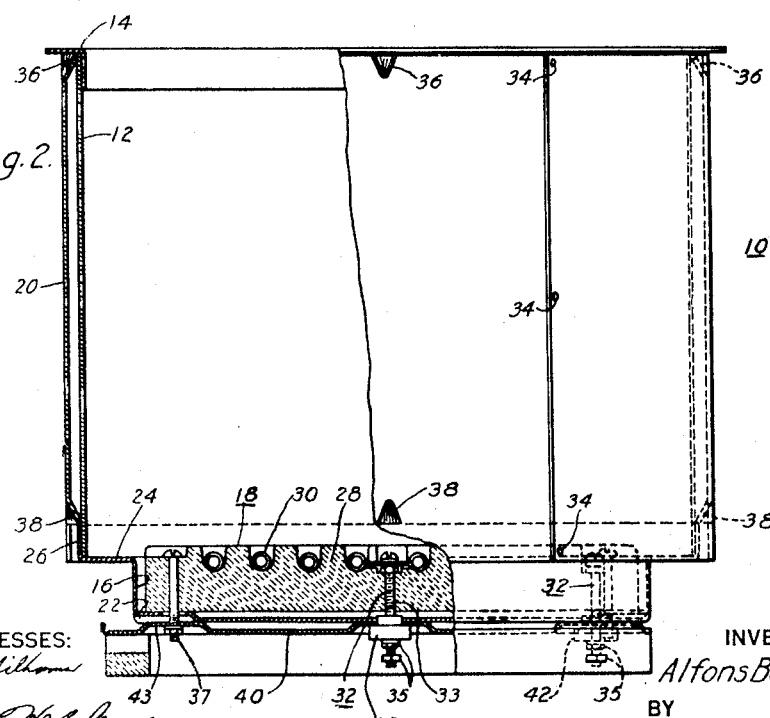
Fig. 2 is a partial sectional and elevational view of the device shown in Fig. 1.

The outer jacket and casing 20 is, in this instance, formed into substantially a cylindrical sleeve having diameters slightly larger than the inner casing 12 of the cooking structure 10. However, it is to be understood that such casing is to have the same type of cross-section as casing 12, no matter what type it may have. Such outer casing 20 is, in this instance, formed of a single sheet of metal and is fixedly attached within to form a unitary structure by means of suitable rivets 34 or the like (see Fig. 2). Inwardly extending protuberances or louvers 36 and 38 are formed within the outer casing 20 to engage the inner casing 12 and the cup-shaped member 16, to space and retain such outer casing about the inner casing. The louvers 36 are punched or formed inwardly about the upper edge of the outer casing 20. However, it is to be understood that such louvers may be located at any other point desired within the casing. The louvers 38 are punched or formed within the lower portion of the casing 20 and are located at such a point that the lower edges thereof will engage the upper edge of the upwardly extending ring portion 26 of cup member 16 when the outer casing 20 is positioned in its uppermost location in engagement with the flange 14, see Fig. 2. The louvers 38 by engaging the upper edge of cup-shaped member 16 retain the outer casing 20 about the inner casing 12 and prevent the ready removal thereof, as hereinafter described.

The outer jacket or casing 20 is positioned about the functionally integral inner vessel in a simple operation and is retained thereabouts without the need of any additional structural parts. The outer jacket or casing 20 is merely slid upwardly about the inner casing 12, the upper louvers 36 sliding over the ring portion 26 of cup-shaped member 16 by expanding outwardly. As the outer casing is forced upwardly, the upper louvers 36 then contact the outer surface of the inner casing 12 and space the outer casing an equal distance therefrom. The outer casing 20 is further forced upwardly until the upper edge thereof engages the lower surface of flange 14. The lower louvers 38, when contacting the cup-shaped member 16, are likewise biased outwardly until they pass above the upper edge of such cup member, at which time they expand back to their normal configuration, engaging both the upper edge of the ring portion 26 of cup member 16 and the outer surface of the inner casing 12. The louvers 36 and 38 thus position the outer jacket 20 about the inner jacket 12 a predetermined distance from the sides thereof while the louvers 38, in addition, due to their engaging the upper surface of cup-shaped member 16, retain such outer jacket 20 in the proper position about the inner vessel 12.

Various modifications may be made in the device embodying my invention without departing from the spirit and scope thereof, and I desire, therefore, that only such limitations shall be placed thereon as are imposed by the prior art and the appended claims.

I claim as my invention:

1. A cooking well comprising an inner casing having an outwardly-extending upper flange, a bottom cap member attached to the casing, a preformed outer casing having an upper and a lower row of inwardly extending louvers formed therein, said upper row of louvers engaging said inner casing and said lower row of louvers engaging the cap member and said casing, whereby said two rows of louvers retain the outer casing in position about the inner casing with the upper edge of said outer casing engaging the underside of said flange.

2. A cooking well comprising an inner casing, an outwardly extending flange positioned about the upper portion thereof, a cap member attached to the bottom of the casing about the outer surface thereof and having an upwardly extending ring-like portion which fits about the lower portion of the inner casing, a preformed outer casing positioned about the inner casing, and an upper and lower row of inwardly extending protuberances formed within the outer casing, said upper edge of the outer casing engaging the lower surface of the flange, said lower protuberances engaging the upper surface of the ring-like portion of the cap member to retain said outer casing about the inner casing, the two rows of protuberances engaging the inner casing so as to keep the outer casing spaced outwardly from said inner casing.

ALFONS BARNSTEINER.